United States Patent Office 3,516,943
Patented June 23, 1970

3,516,943
REPLACEMENT OF CAPSULE CONTENTS
BY DIFFUSION
Carl Brynko and Gerald M. Olderman, Dayton, Ohio, assignors to The National Cash Register Company, Dayton, Ohio
No Drawing. Continuation of application Ser. No. 148,736, Oct. 30, 1961. This application Dec. 6, 1966, Ser. No. 599,648
Int. Cl. A23d 3/04; A23l 1/26; B01j 13/02
U.S. Cl. 252—316                                   11 Claims

ABSTRACT OF THE DISCLOSURE

A process is disclosed for manufacturing, en masse, minute gelatin-walled capsules containing a liquid material introduced into the capsules by diffusion through the capsule walls. In a preferred embodiment, original, oily, capsule content is replaced by a substitute liquid, miscible with water and with the original oily content, by suspending the capsules in the substitute liquid to accomplish exchange of the original material with the substitute liquid.

---

This is a continuation of patent application Ser. No. 148,736, filed Oct. 30, 1961, now abandoned.

This invention relates to a process for making gelatin-walled capsules with substituted contents by through-the-wall replacement of originally contained oily fluids, and to the capsule product, and more particularly pertains to such a process carried on en masse, in which process minute seamless-walled capsules are suspended in a replacement liquid, which replacement liquid by diffusion through the capsule walls comes to an equilibrium state with the original oily contents of the capsules without breaking the walls.

The process is useful in replacing originally encapsulated oily material with either liquid water-miscible materials, other oily materials, or mixtures thereof, although the most striking result of the process is the replacement of the original oily contents of the capsules, through the walls of the capsules, by water-miscible materials. Such replacement is brought about through the medium of a mutual solvent which aids in the diffusion exchange in both directions through the water-containing gelatin walls. This mutual solvent should have a dielectric coefficient "ϵ" of less than 20, at 25 degrees centigrade, to insure impermeability of the completed capsules. Further steps are provided for rendering the capsule walls impermeable after the diffusion exchange has taken place.

In all the known en masse processes for making capsules with seamless walls by depositing gelatin, or gelatin and a complexing polymer dissolved in an aqueous vehicle, on liquid droplets of nucleus material dispersed in said vehicle, the nucleus material must be of an oily water-immiscible character, as otherwise the integrity of the nucleus droplets could not be maintained in the aqueous vehicle during the process. Reference is made to U.S. Pat. No. 2,800,457, which issued on the joint application of Barrett K. Green and Lowell Schleicher on July 23, 1957, and to U.S. Pat. Re. 24,899, which issued on Nov. 29, 1960, on the application of Barrett K. Green, which reissue patent is based on original U.S. Pat. No. 2,800,458, which issued on July 23, 1957. The mentioned patents pertain to a process for the manufacture, en masse, in an aqueous manufacturing vehicle, of microscopic oil-containing capsules having walls of film-forming hydrophilic polymeric material, that of U.S. Pat. No. 2,800,457, being gelatin alone and that of U. S. Pat. No. Re. 24,899 being a complex of gelatin and a complexing polymeric material such as gum arabic. Microscopic capsules made by the methods disclosed in the patents necessarily contain water-immiscible material which, if a liquid, is classified as an oil. Polar liquids could not be encapsulated, as they could not be dispersed in an aqueous manufacturing vehicle.

Capsules such as those made by the mentioned patented processes are microscopic, but in later developments larger sizes have been made en masse, even up to 3,000 microns or more in diameter, as disclosed in applicant Brynko's U. S. Pat. No. 3,190,837, issued June 22, 1965, for which application was made jointly with Joseph A. Scarpelli. The capsules made by the method described in said Brynko-Scarpelli patent are made in such a manner that they tend to remain single, instead of aggregating in botryoid groups of small size. In said Brynko-Scarpelli application, the oil is introduced into the gelatin-containing solution drop by drop, and, by bringing about a first condition of coacervation to form a first liquid polymer wall about the oil droplets, the system is returned to a non-coacervate state by pH change to rid it of the coacervated but undeposited polymeric material which contaminates the aqueous vehicle. Following such decoacervation, the system is rejuvenated by adding more polymer of a different composition—to wit, polyethylene-maleic anhydride—and causing a resumed coacervation condition by dropping the pH, to cause more deposition of a wall material, what is left in the vehicle thereafter not being of a nature to induce the botryoid aggregation, thus resulting in individual capsules better subject to exchange.

Indeed, the size of the capsule or the method of its manufacture is not critical in the practice of the instant invention, as long as the wall material is or contains a large percentage of gelled gelatin which contains water in its molecular network. It is recognized that large gelatin-walled capsules which can be individually handled can have their contents extracted by means of a hollow needle and replaced by water-containing liquids and be re-sealed. This invention is aimed particularly at the replacement of liquids in capsules, not by individual handling of the capsules, but by a process of replacement in capsules en masse, and not only is adaptable for large capsules but also enables replacement to be effected in minute capsules that cannot be handled individually, the replacement of the liquid contents being made by molecular diffusion through the capsule walls as the capsules are agitated in a liquid polar vehicle. The polar vehicle, which is a solvent for the originally encapsulated material, can dissolve the originally encapsulated material, said material and whatever else is contained dissolved in the polar vehicle exchanging through the walls of the capsules until an equilibrium is reached. In the process, the polar vehicle is provided in such excess, and by such repeated replenishment thereof, that the residual original material in the capsules at the conclusion of the transfer is of no practical significance.

The process involves the swelling of the capsule walls, if necessary, to aid in the diffusion exchange, and also involves the shrinkage of the capsule walls to retain the newly introduced liquid material. It is well known that gelled gelatin films such as those which form the walls of gelatin capsules have a quantity of retained water, the extraction of water therefrom causing the films to shrink, and the addition of water thereto causing the films to swell. The water in the films composing the walls of the capsules affords the means by which diffusion of the mutual solvent and its dissolved material, if any, takes place. It is preferred to have the walls of capsules used in the process of this invention in a swollen condition, and providing the necessary water is a part of the process, but only if the walls are not already in a swollen condition. Conversely, after the diffusion exchange has taken place, the capsule walls preferably are shrunk to an impermeable condition by extraction of water therefrom.

The mutual liquid solvent, whether it carries other material or not, must have water-attracting groups as well as oil-attracting groups in order to pass into the capsules through the water-containing gelatin walls of the capsules and to dissolve the original oily contents of the capsules, which dissolved contents in time will come into equilibrium with the external liquid by complementary diffusion out through the capsule walls, the dissolved water in the capsule walls thus affording a two-directional path for the equilibrization.

The mutual solvent may be a combination of liquids in solution, the latter solution itself having a dielectric coefficient "$\epsilon$" less than 20 even though one of the components of the mixture alone has a higher dielectric coefficient.

The invention provides a process for the manufacture of minute capsules having walls in whole or in part of gelatin and contents consisting of water-miscible materials. Thus minute droplets of essential oils consisting of oily components and water-miscible components can be confined individually in gelatin or gelatin-containing walls. In one particular field, this encapsulation in gelatin walls is important; namely, the encapsulation of flavors, the capsule walls and contents of which must be edible. Gelatin and gelatin-gum-arabic complexes, of which the walls of the capsules may be made, are of an edible nature.

To render the capsules impermeable to the liquid contents, the walls may be dehydrated to a glassy condition by being immersed in a water-absorbing fluid such as anhydrous ethanol or dioxane. During such dehydration, the capsule walls and their contents are robbed of moisture, resulting in a shrinking of the capsule walls about the contents.

It will be apparent that, inasmuch as the exchange of the capsule contents can be carried out at room temperature (20 degrees to 25 degrees centigrade) and below, volatile materials which are difficult to encapsulate by deposition techniques at temperatures compatible with deposition of gelatin, or complexes containing gelatin, from an aqueous solution may be introduced into already-formed gelled gelatin or gelatin complex cases, by the novel exchange process.

Due to the fact that the exchange between the original oily contents of the capsules and the mutual solvent and its contents, if any, is one of equilibrium diffusion, the final contents of the capsules will contain some small remnant of the original oily material. By successive treatments with fresh mutual solvent material, this residuum is reduced to a very small fraction of one percent.

The treatment of the finished capsules with absolute ethyl alcohol or absolute dioxane, which dehydrates and shrinks the capsule walls to a glassy condition, will enable them to resist the taking on of any water from a humid atmospheric environment, in addition to rendering the walls impermeable to the substituted liquid contents.

The mutual solvent, its contents, if any, and the original liquid in the capsules must be present in amounts to insure that they constitute a single phase when mingled, and such may be judged visually, as a multiple-phase system exhibits cloudiness when agitated or layering when allowed to stand. The initial water content of the system, including the gelatin-trapped water, should not exceed ten percent, by weight.

The invention will be described with reference to a preferred embodiment, other embodiments, and equivalent materials which may be used in conjunction with or in place of materials used in the specific embodiments.

EXAMPLE I

This example encompasses the substitution of dioxane for the original toluene content of minute capsules having seamless gelled walls of a complex of gelatin and gum arabic. Dioxane is miscible with both water and organic solvents, such as the specified toluene, and has a dielectric coefficient of 2.2 at room temperature (20 degrees to 25 degrees centigrade), thus exhibiting the necessary properties for the diffusion exchange.

Toluene-containing capsules may be made by forming an aqueous solution of pigskin gelatin, having an iso-electric point of pH 8.9–9.0, heated to 55 degrees centigrade and consisting of 25 grams of the gelatin and 202 grams of water, mixed with a solution of 25 grams of gum arabic and 202 grams of water of the same pH and temperature. To 360 milliliters of the mixture-solution, adjusted to pH 6.5, is added 700 milliliters of water, and with moderate stirring, with a blade stirrer, during a lowering of the temperature to 40 degrees centigrade, and after the lowering of the pH of the system to 4.5, 200 grams of toluene is introduced by means of a burette, the tip of which is adjacent the stirring blade beneath the surface of the solution, so that an initial drop-by-drop dispersion is made, the drop size being controlled by the release rate of the burette in conjunction with the shearing force of the stirred liquid system. When all the toluene has been dispersed, its drop size may be reduced by continued adjusted stirring, to give the desired ultimate drop size, which may vary from several thousand microns, on the average, to several microns, on the average. The liquid entities of gum arabic-gelatin complex coacervate, produced by the drop in pH to 4.5 plus the drop in temperature and the stirring, deposit on the toluene droplets and coalesce thereon to form gelable liquid walls around each. These liquid-walled capsules are transformed into capsules having gelled self-supporting walls by continued stirring of the system as the temperature is dropped to 10 degrees centigrade. Such capsules, having gelled walls, are separated from the manufacturing liquid vehicle by filtering, the walls of the capsules retaining water in the gelatin network, said water providing the porosity necessary for the step of exchanging most of the toluene for dioxane. The capsules must be kept chilled during filtering to prevent them from sticking together, as they tend to do at room temperature if packed together without a liquid dispersion medium.

To bring about the exchange of capsule contents with dioxane, 400 grams of the chilled filtered capsules is dispersed in one liter of dioxane at room temperature, being stirred for about three hours, after which about 80 percent of the capsule contents is dioxane exchanged for a similar amount of toluene. This percentage of dioxane within the capsules may be increased until full equilibrium is reached by further stirring, about 90 percent being the equilibrium limit for the amount of dioxane used. Increased ratio of dioxane to capsules, of course, increases the equilibrium limit and, accordingly, the percentage of dioxane in the capsules. To seal the capsule walls, the capsules are subjected to dehydration by immersion in a large quantity of anhydrous dioxane, anhydrous ethanol, or equivalent water-absorbing liquid. The resulting capsules have glassy walls which are highly impermeable to the dioxane.

Such capsules may be recovered from the dioxane equilibrium vehicle, or wash vehicle, and dried by evaporation, the capsules then being free-flowing as any dry particulate solid, although about 80 percent of the capsules, by weight, is of the retained liquid contents, which later may be released by dissolution or rupture of the capsule walls, if desired.

EXAMPLE II

This example is concerned with the exchange of butyl acetate for toluene in capsules made according to Example I. Butyl acetate is not infinitely soluble in water, as is dioxane, its solubility being 0.5 gram per 100 milliliters of water at 25 degrees centigrade, but it does have the necessary low dielectric coefficient, which is 5.0. However, by making a liter solution of 10 percent dioxane and 90 percent butyl acetate, the exchange can be made in the same manner as set out in Example I, the resulting capsules having a final liquid content which is 60 to 70 percent butyl acetate, the dioxane preventing phase separation of the butyl acetate-water mixture. These capsules can be recovered by filtering and redispersed in butyl acetate, which reduces the water content to 0.01 percent based on capsule contents.

EXAMPLE III

In this example there will be considered the process of making edible capsules protecting edible contents of liquid state and having oil-soluble and water-soluble components. To begin with, capsules are made with an oil content like that of those made according to the process of Example I, except that the oil is of an edible nature, such as corn oil, which is representative of an untreated natural product, or an acetylated monoglyceride, which is an edible stable derivative of a natural oil. The latter oil is selected from the monoglycerides, which are derived from lard and which are almost wholly acetylated, thereby acquiring good oxidative stability and solubility in ethanol. The product sold now by "Distillation Products Industries," a division of Eastman Kodak Company, of Rochester, N.Y., United States of America, under the trade-name "Myvacet–119–40," is a particularly suitable type, which has adequate solubility in ethanol at room temperature (20 degrees to 25 degrees centigrade) for the purposes, and which is a clear colorless liquid having a viscosity at 20 degrees centigrade of 50 centipoises and a specific gravity of 0.99. An amount of the acetylated monoglyceride equivalent to the toluene of Example I is used. The capsules are filtered, and 400 grams of the filter cake is dispersed in one liter of an 80 percent aqueous sorbitol solution and stirred 30 minutes, after which the excess solution is replaced with ethanol in an amount equal by volume to the original filter cake, in an anhydrous atmosphere. After 30 minutes' stirring, the supernatant liquid is decanted, and the last-noted treatment with ethanol and its decantation is repeated until the desired exchange level is reached. To seal the capsules more effectively, several quick washes in absolute ethanol are carried out to eliminate the last traces of moisture. The sorbitol plasticizes and aids in sealing the capsule walls. The capsules may be recovered and dried, whereupon they may be handled as granular solids.

The ethanol may be used to introduce water-soluble components into the capsules in exchange for the original contents, in part, and the introduction of edible components into the capsules by use of ethanol is the subject of Examples IV and V.

EXAMPLE IV

In this example, the objective is to encapsulate lemon oil, containing both oil-soluble and water-soluble components, by an en masse process. First, capsules are made with contents of d-limonene, an oil, using the method of Example I, except that d-limonene is used in place of toluene in equivalent amount. As d-limonene is part of the total make-up of lemon oil, any residual amount of d-limonene left in the capsules after the exchange merely contributes to the resultant flavor material finally residing in the capsules and available therefrom by dissolution of breach of the capsule walls. Concentrated terpeneless lemon oil dissolved in ethanol is the exchange medium. The filter cake of capsules with the d-limonene content, of a total weight of about 400 grams, is immersed in 500 grams of ethanol contained in a one-liter flask fitted with a drying trap to maintain an anhydrous atmosphere, and the system is stirred for one hour, more or less, to initiate the exchange, after which the supernatant liquid is decanted off and replaced with an equivalent amount of a solution of 20 percent terpeneless lemon oil in ethanol, the system thereafter being stirred for approximately five hours. If the initiating immersion of the capsules in plain ethanol were not used, the exchange time would be longer, such practice being followed where one of the combination of liquid exchange solvents tends to reduce the rate of exchange. The capsules then contain about 10 percent lemon oil components in natural balance in ethanol. To seal the walls, the capsules having the exchanged contents are recovered by filtering and are washed in warm (35 degrees to 40 degrees centigrade) ethanol saturated with sorbitol. These capsules may be dried with a drying-aid material such as starch, or dried by use of a fluidized-bed drier.

EXAMPLE V

In this example, ethanol-solution-containing capsules are prepared according to Example III and, after the third wash in ethanol, are recovered on a filter bed, and 400 grams of such are redispersed in a solution of 300 milliliters of ethanol containing in solution 30 percent vanillin, the exchange solution and capsules being stirred for several hours or more to achieve the desired level of exchange. The capsules then may be sealed by several quick washes in absolute ethanol. The foregoing vanillin exchange illustrates the feasibility of exchanging the oil contents of capsules with a solution of edible solids in ethanol.

The five examples are exemplary only, as the exchange mutual solvents with the necessary dielectric coefficient and water solubility are many, including combinations of such. A table of single solvents useful for forming exchange solutions follows:

| Solvent | Dielectric constant | Water solubility in grams per 100 milliliters of water |
|---|---|---|
| Dioxane | 2.2 | Inf. |
| Ethanolamine | 2.3 | Inf. |
| Diethyl ether | 4.3 | 7.5 |
| Butyl acetate | 5.0 | 0.7 |
| Methyl isobutyl ketone | 12.0 | 2.0 |
| Amyl alcohol | 13.9 | 2.7 |
| Methyl isopropyl ketone | 15.0 | 4.7 |
| Butyl alcohol | 17.1 | 9.0 |
| Methyl ethyl ketone | 18.4 | 18.0 |
| Propyl alcohol | 20.1 | Inf. |
| Acetone | 20.17 | Inf. |
| Epichlorohydrin | 22.9 | 5.0 |
| Ethanol | 24.3 | Inf. |
| Dimethylformamide | 26.6 | Inf. |
| Formamide | 109.0 | Inf. |

The latter three alone could not be held exchanged in the capsule walls for more than a few hours after being recovered from the exchange liquid vehicle. This shows the relation between a low dielectric coefficient (under 20 for dependable retention) and capsule permeability to water-miscible liquids.

It has been discovered that, if combinations of mutually water- and oil-miscible solvents together have a dielectric coefficient under 20, such are suitable for capsule content exchange and result in gelatin-walled capsules that are impermeable to water-miscible liquids, it being understood, of course, that the final capsule content is the equilibrium liquid partially consisting of the mutual solvent, and that the capsule walls have been shrunken by dehydration. There are listed below pairs of liquid solvents which together have low dielectric coefficients and which have the mutual solvent characteristics needed for capsule content exchange:

Solvent system:     Dielectric coefficient
    Dioxane-acetone _____ 11
    Ethanol-diethyl ether _____ 15
    Dioxane-methyl ethyl ketone _____ 9
    Ethanol-lemon oil _____ 17
    Ethanol-castor oil _____ 15

Of course, solvent exchange systems containing more than two components may have the necessary low dielectric coefficient and the necessary solvent characteristics to provide an exchange medium.

Tests have been made of the exchange of the oil of capsules for water-miscible flavors that have many separate components, such as the water-miscible fraction of flavors expressed from various seeds, leaves, fruits, and stems of plants, and it has been found that the water-miscible components are exchanged through the gelatin walls in the naturally-existing ratio save for those fractions which may be reactant chemically with elements of the exchange system, including the capsule walls and the original capsule contents. Of the fifteen or so recognized components of the water-miscible portion of liquid expressed from roasted coffee beans, practically all can be exchanged in the manner described, without any change in the natural ratio.

The rate of exchange of the contents of capsules of various sizes, in the minute range of 5 to 5,000 microns, varies, the initial exchange, involving about 20% of equilibrium, taking several hours, and the rest of the exchange, up to 80% for the smaller capsules, tapering off toward equilibrium after six hours. The presence of a gelatin plasticizer in the exchange vehicle reduces the rate and final percentage of exchange. The viscosity of the original contents also plays a part in the rate of exchange, the rate being slower for the more viscous liquid contents, as would be expected.

Generally, the exchange must be carried out with capsules having water-swollen gelatin wall content, the water being supplied from the excess present at the conclusion of the recovery thereof on the original filter step following the capsule manufacture, or supplied thereto thereafter, if the capsules have been dried, through water content of the solvent exchange medium. The hardening of the original capsules by tanning of the gelatin by treatment in a solution of formaldehyde, glutaraldehyde, or equivalent does not interfere with the necessary swelling of the capsule walls by supplied moisture, but they are not so porous and require more time for the exchange of their contents.

The moisture content of the final internal phase, as exchanged, should not be more than 0.5 percent for good retention.

The capsules with the exchanged content, if the capsules have not been hardened in a non-aqueous medium, will release their contents in water by re-exchange outwardly through the swollen capsule walls. Otherwise, the contents of the capsules may be released by rupture of the capsule walls by physical or chemical means apart from diffusion. If unhardened gelatin capsules are introduced into water at 45 degrees centrigrade, the walls dissolve completely, leaving no gelled casings as residue. The same is true of gelatin-gum-arabic capsule wall complexes. In environments of 70 degrees to 80 degrees centigrade, the unhardened gelatin-walled capsules melt in the absence of water to release their contents.

In U.S. Pat. No. 2,971,916, which issued to Lowell Schleicher and Charles S. Baughman on Feb. 14, 1961, there is disclosed a method of making microscopic capsules having gelled walls of gelatin-gum-arabic complex material and contents of trichloro-diphenyl having suspended therein micro-fine particles of magnetic iron oxide. The chlorinated-diphenyl content of such may be exchanged for ethanol, leaving the magnetic iron oxide particles dispersed inside the capsules in the new equilibrium liquid. The presence of undissolved solid matter in the original oily contents of the capsules does not interfere with the exchange, be such solid material inert or of a nature that must be protected from the environment to keep it from reaction with the atmosphere or with whatever it may come into contact with when released from the capsules.

It also is within the scope of the invention to provide coloring material, color-reactant material, or other reactant material as a solvent exchange medium or a solute therefor, such as water-soluble dyes or dye reactants, or absorbed gases.

It is evident from the foregoing specification that the choice of materials permits of many combinations which may result in capsules having various uses, the entire point of the invention being the provision of seamless gelatin-walled capsules of minute size, having water-miscible liquid content, and the making of such en masse by an exchange of original oily liquid contents of capsules by treatment in an exchange liquid vehicle containing in solution the water-miscible material, and said exchange liquid being a solvent also for the original oily contents of the capsules. The conditioning of the capsule walls to a swollen condition, if they are not already in that state from their original condition as filtered in the process of manufacture, may constitute a step of the process if water is not present in the mutual solvent.

As there appears to be no previously known way to manufacture gelled-gelatin-walled capsules, or capsules having walls containing gelled gelatin, of minute and microscopic size, with water-miscible contents, the invention will be broadly claimed.

What is claimed is:

1. A process for replacing the water-immiscible liquid contents of capsules having walls at least partially consisting of gelled gelatin in a dehydrated and shrunken condition, including the steps of:
   (a) immersing the capsules in a liquid exchange vehicle which is miscible with water and the capsule contents and which contains water sufficient to swell the dried gelatin content of the capsule walls, the original liquid contents being replaced with the exchange vehicle by diffusion through the capsule walls continuing to a diffusion equilibrium state over a period of time.

2. The process of claim 1 including the additional step of recovering the capsules from the exchange vehicle after the desired degree of diffusion has been attained; and immersing the recovered capsules in an anhydrous liquid which is water-absorbent, to dehydrate and shrink the gelatin content of the capsule walls.

3. The process of claim 1 in which the liquid exchange vehicle has a dielectric coefficient "$\epsilon$" of less than 20 at 25 degrees centigrade.

4. The process of claim 1 in which the exchange vehicle includes two miscible liquids whose combined dielectric coefficient "$\epsilon$" is less than 20 at 25 degrees centigrade.

5. A process for the replacing of water-immiscible liquid contents of gelled gelatin-walled capsules, without rupture of the walls, including the steps of:
   (a) providing such capsules, with their walls being in a swollen state due to absorbed water; and
   (b) dispersing said capsules of step (a) in a liquid exchange vehicle which includes two miscible liquids whose combined dielectric coefficient "$\epsilon$" is less than 20, at 25 degrees centigrade and which exchange vehicle is miscible with water and the capsule contents, the original liquid contents being replaced with the exchange vehicle by diffusion through the capsule walls continuing to a diffusion equilibrium state over a period of time.

6. A process for the replacing of water-immiscible liquid contents of gelled gelatin-walled capsules, without rupture of the walls, including the steps of:
   (a) providing such capsules, with their walls being in a swollen state due to absorbed water; and
   (b) dispersing said capsules of step (a) in a liquid exchange vehicle which is miscible with water and the capsule contents; and
   (c) recovering the capsules from the exchange vehicle after the desired amount of diffusion has taken place, and immersing said recovered capsules in an anhydrous water-absorbing liquid to extract water from the capsule walls, thus shrinking said walls to a condition impermeable by the liquid then in the capsules.

7. A process for the replacing of water-immiscible liquid contents of gelled gelatin-walled capsules, without rupture of the walls, including the steps of:
   (a) providing such capsules, with their walls being in a swollen state due to absorbed water; and
   (b) dispersing said capsules of step (a) in a liquid exchange vehicle which contains, in solution, a material that it is desired to introduce into the capsules along with the exchange vehicle and which exchange vehicle is miscible with water and the capsule contents, the original liquid contents being replaced with the exchange vehicle by diffusion through the capsule walls continuing to a diffusion equilibrium state over a period of time.

8. The process of claim 7 wherein the material dissolved in the liquid exchange vehicle is a solid.

9. The process of claim 7 wherein the material dissolved in the liquid exchange vehicle is a liquid containing a solid in solution.

10. The process of claim 7 wherein the material dissolved in the liquid exchange vehicle is a water-miscible liquid.

11. The process of claim 7 wherein a solid is dispersed in said water-immiscible liquid contents of the capsule.

References Cited

UNITED STATES PATENTS

| | | | |
|---|---|---|---|
| 2,990,333 | 6/1961 | Graham | 424—37 |
| 3,043,782 | 7/1962 | Jensen | 252—316 |

FOREIGN PATENTS

| | | |
|---|---|---|
| 795,977 | 6/1958 | Great Britain. |

RICHARD D. LOVERING, Primary Examiner

U.S. Cl. X.R.

99—22, 71, 118, 140; 117—100; 424—37